Jan. 19, 1960 C. H. MILLER 2,921,376
LAYOUT FIXTURE
Filed Jan. 4, 1957 3 Sheets-Sheet 3
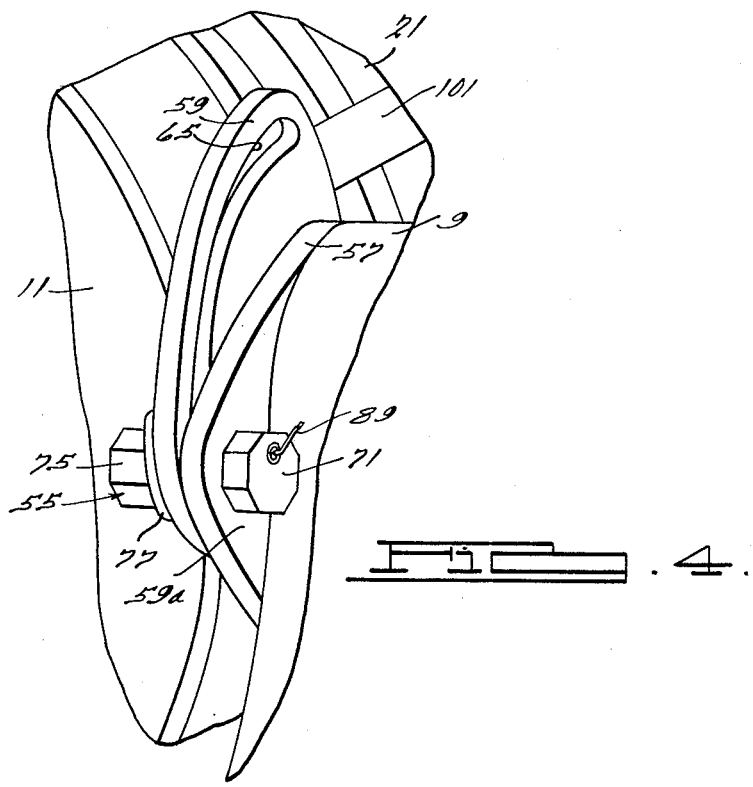
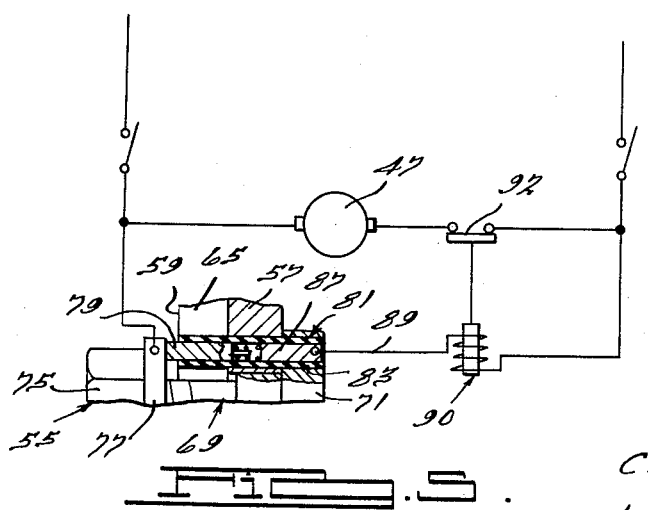
INVENTOR.
Clarence H. Miller
BY
Harness, Dickey & Pierce
ATTORNEYS.

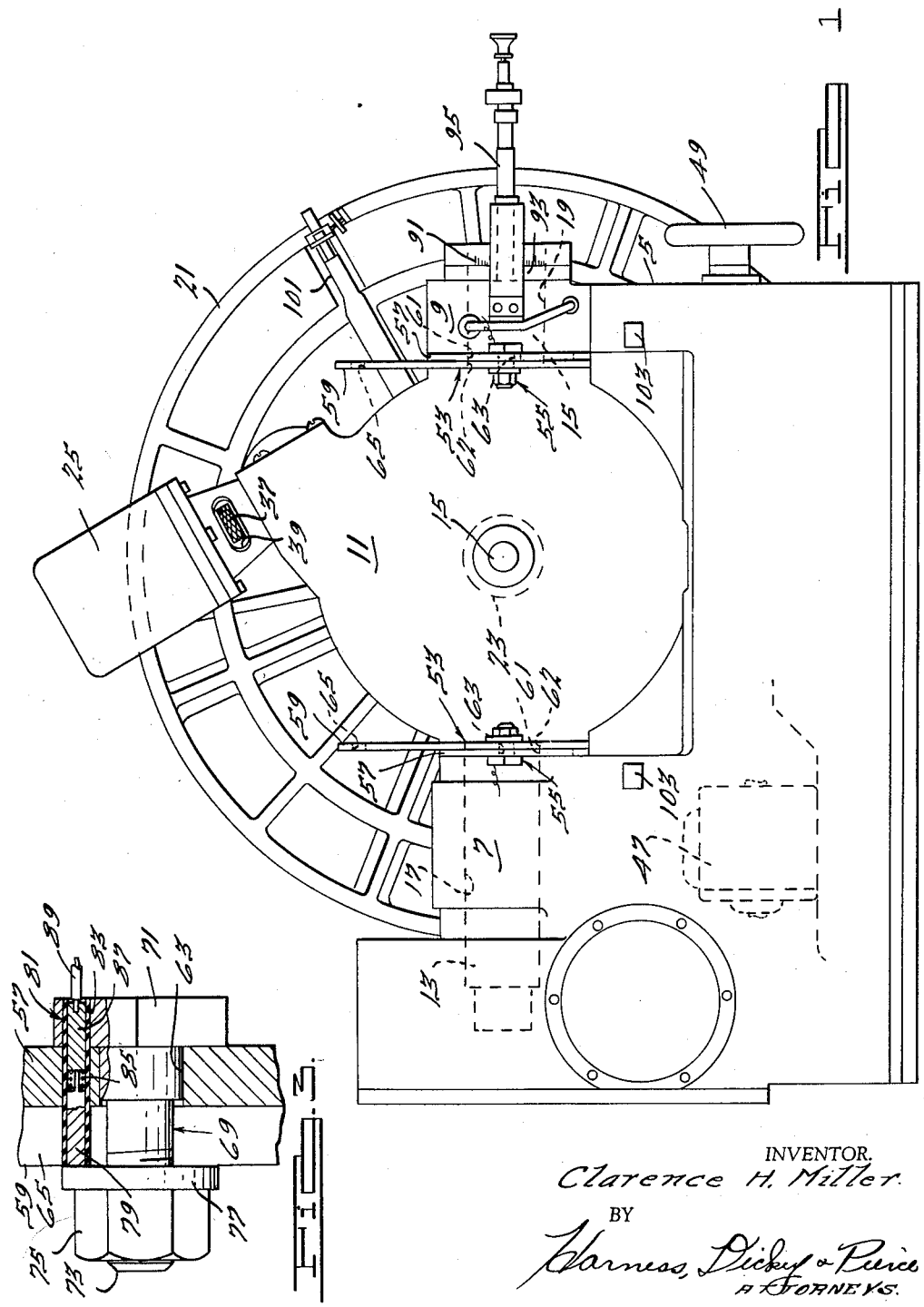

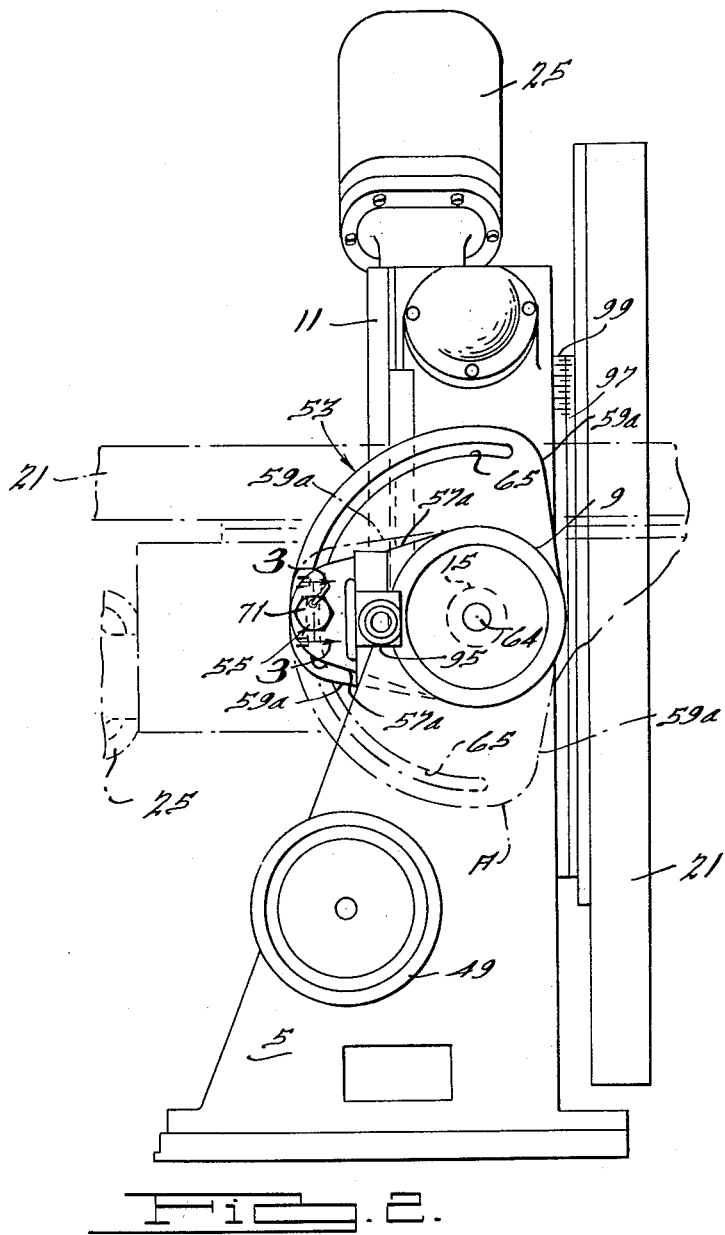

United States Patent Office 2,921,376
Patented Jan. 19, 1960

2,921,376

LAYOUT FIXTURE

Clarence H. Miller, Detroit, Mich., assignor to Machine Products Corporation, Detroit, Mich., a corporation of Michigan Application January 4, 1957, Serial No. 632,531

2 Claims. (Cl. 33—174)

This invention relates generally to checking device, and more particularly it relates to a precision layout table and constitutes an improvement of the structure shown and claimed in Patent No. 2,380,664 issued to me July 31, 1945 and of the structure shown and claimed in copending application Serial No. 547,171 filed November 16, 1955 entitled "Layout Fixture."

It is an object of the present invention to provide improvements in a layout fixture of the type which may be precisely and finely adjusted and which includes a table support member trunnioned for movement about one axis and a layout table rotatably supported by the table support member for movement about another axis perpendicular to said one axis and which incorporates improved means for locking the table support member in any desired angular position while a measurement is being made.

It is another object of the invention to provide a layout fixture of the character indicated which embodies improved locking means which permits ninety degrees arcuate travel of the table support member and which positively locks the same in selectable angular settings.

It is another object of the invention to provide in combination with the table support member of a layout fixture of the type specified, improved locking means in a form which is readily accessible for maintenance and which does not operate on the trunnions for the table support member nor affect the journaling thereof.

It is a still further object of the invention to provide a layout fixture of the type described which incorporates an improved combination comprising the locking means mentioned and electrical disconnect means for rendering inoperative the table support actuating motor while the table support member is locked in any selected angular setting.

The above and related objects will become apparent during the course of the following description taken in conjunction with the accompanying drawings.

In the drawings:

Figure 1 is a rear elevational view of a layout fixture embodying the improvements of the present invention;

Fig. 2 is a side elevational view of the structure of Fig. 1 with parts removed also showing in dotted outline a different positional relationship of the several movable elements thereof;

Fig. 3 is a fragmentary horizontal sectional view of the structure of Fig. 2 taken along the line 3—3 thereof;

Fig. 4 is a fragmentary perspective view of the table support member clamping means and adjacent parts; and Fig. 5 is an electric circuit drawing showing diagrammatically the relationship between the support member actuating motor and the support member clamping means.

In the embodiment of the invention illustrated, the apparatus includes a heavy cast base 5 which forms the supporting structure for the working parts of the fixture. The base 5 is formed with two upstanding yoke portions 7 and 9 between which a table support member 11 is rotatably carried. Fixedly secured to and extending from both sides of the table support member 11 are trunnions 13 and 15 journaled for rotation respectively in axially aligned openings 17 and 19 in the yoke portions 7 and 9. The table support member 11 rotatably supports a circular table 21 on which the parts to be measured are placed. The central supporting shaft for the table 21 to which it is secured is indicated at 23 in Fig. 1 and is rotatably supported in the table support member 11 so that the face of the table is always maintained parallel to the axis of rotation of the table support member 11. A part secured to the table 21 may thus be moved through angles lying in two perpendicular planes by rotating the table 21 and the table support member 11 about their respective axes. The table 21 and the table support member 11 may be rotated either manually or by activation of electric motors which are geared respectively to the table 21 and to the table support member 11 by means shown in dotted outline in Fig. 1.

The motor for rotating the table 21 is indicated at 25 and is fixed with respect to the table support member 11 as shown. The shaft from the motor 25 is connected through suitable gearing (not shown) to the table supporting shaft 23 and rotatably drives the table 21 upon energization of the motor 25. Reference may be had to the copending application for a showing and description of such gearing, it being sufficient for the purposes herein to state that it is so constructed that it permits the use of a relatively small motor and accomplishes gradual movement of the table 21. For manually adjusting the table through extremely fine increments a knurled knob 37 is keyed to the shaft of the motor 25 and is accessible through an aperture 39 in the housing thereof.

The structure for rotating the table support member 11 is disposed within the base 5 and includes a worm wheel (not shown) secured to the free end of the trunnion 13 and driven through suitable gearing (not shown) which includes a speed reducer mechanism and which is connected to the output shaft of a driving motor 47 for the table support member 11. For manually turning the table support member 11 a hand wheel 49 is provided which is fixed on a horizontal shaft (not shown) having a driving connection with the trunnion 13 through the drive shaft for the table support driving motor 47. To prevent the motor 47 from operating after the table support member 11 has reached the limits of its travel suitable limit switches (not shown) may be provided on the base 5 and arranged so as to be tripped at these limits to deactuate the motor 47 preventing injury to various parts of the apparatus. Both the table support member 11 and the table 21 are provided with locking means to lock them in any desired angular position while a measurement is made. The structure for locking the table 21 and other details of construction which do not constitute a part of the present invention are adequately described in the copending application previously referred to.

The means for locking the table support member 11 however, in combination with other structure as shown, constitutes the subject matter of the present invention and will now be described. The locking means for fixing the position of the table support member 11 in selectable angular settings comprises two pairs of plates each indicated generally at 53 disposed between the yoke portions 7 and 9 and at opposite sides of the table support member 11 and fastener means designated generally 55 for fixedly securing each pair of plates 53 in adjustably different positions. The pairs of plates 53 function in the manner to be described as elements of the improved locking means and also as thrust surfaces between the table support member and the yoke portions 7 and 9. Each pair of plates 53 consists of a stationary plate 57 affixed to the base 5 by way of one of the yoke portions 7 and 9 and a movable plate 59 secured to the table support member 11 and rotatable therewith adjacent its respective stationary plate 57. The plates 57 and 59 are provided with enlarged apertures 61 and 62 respectively through which the trunnions 13 and 15 extend. The apertures 61, 62 are eccentrically disposed with respect to their corresponding plates and have a common center which coincides with the axis of rotation of the table support member 11 and is indicated at 64 in Fig. 2.

Each stationary plate 57 extends outwardly from its respective yoke portion at the rear of the fixture and the opposite sides 57a thereof gradually taper toward its relatively narrow free end which is rounded as shown in Fig. 2 and formed with an opening 63. Each movable plate 59 is substantially segmental in shape and spreads outwardly from its point of affixation to the support member 11. The free end of each movable plate 59 extends over an arc slightly greater than 90° as shown by the distance between its sides which are indicated at 59a in Fig. 2. The position of the plate 59 therein shown in solid lines corresponds to that of the table 21 when it is tilted to a vertical position. Each movable plate 59 has formed therein an arcuately shaped slot 65 inwardly of its free end which extends between the sides 59a as shown. Each slot 65 is radially spaced from the center 64 by the same amount as is the opening 63 in the corresponding stationary plate 57 so that the slot 65 is always maintained in register with the opening 63 in its movement between the limits of travel of the table support member 11. The position of the movable plate 59, shown in dotted outline in Fig. 2, is indicated at A and corresponds to the position of the table 21 when it is substantially horizontal to the floor on which the base 5 is supported.

The fastener means 55 for fixedly securing in selectable positions each pair of plates 53 against relative movement over the range of travel of the table support member 11 comprises a bolt 69, the head 71 of which bears against the plate 57 and the shank 73 of which extends through the opening 63 in the plate 57 and through the slot 65 in the plate 59 and is threadably engaged by a nut 75. Disposed between the nut 75 and the plate 59 is a washer 77 which bears against a metal plunger 79. The plunger 79 is an element of electrical disconnect means indicated generally at 81. The plunger 79 is slidably disposed in an insulating sleeve 83 which extends through the head 71 and the plates 57, 59 and is yieldably urged toward the washer 77 by a compression spring 85, one end of which surrounds and is insulated from a reduced shank portion on the end of the plunger 79. The other end of the spring 85 operates against a metal member 87 fixed in the sleeve 83 and to which is secured an insulated conductor 89. The conductor 89 leads to any suitable relay which is interconnected with the circuit carrying current to the motor 47 for rotating the table support member 11 and by which the motor 47 may be deactuated when the plunger 79 is forced inwardly a predetermined amount. When the bolt 69 and nut 75 are tightened to lock the plates 57 and 59 together, the plunger 79 is actuated inwardly a predetermined distance against the urging of the spring 85 and establishes an electrical connection through the member 87 and the conductor 89 as described to render inoperative the table support actuating motor 47. By way of illustration as to how an electrical circuit of this type might work, reference is made to Fig. 5, wherein it will be seen that the motor 47 is connected in a suitable electrical circuit for the machine and the electrical disconnect means indicated generally at 81 is shown as being connected through conductor 89 with a relay 90 which is normally closed when the electrical disconnect plunger 79 is out of engagement with the metal member 87. However, when the electrical disconnect plunger 79 is moved into engagement with the metal member 87, upon tightening of the bolt and nut, relay 90 is actuated so as to open contacts 92 and thereby prevent flow of current from the electrical power source to the motor 47, all as clearly shown in Fig. 5.

As described in the copending application previously referred to a scale 91 is provided on the end of the trunnion 15 while a vernier scale 93 is affixed on the yoke portion 9 and to enable both of the scales 91 and 93 to be viewed a microscope 95 is secured to the yoke portion 9 which permits the angular position of the table support member 11 to be read in seconds of a degree.

Similarly an annular scale 97 is fitted about the under side of the table 21 and registers with another annular scale 99 affixed to the outer periphery of the top side of the table support member 11. The two scales 97 and 99 may be viewed through a microscope 101 (Fig. 1) mounted on the base 5 and the angular position of the table 21 also read to within seconds of a degree. Before any checking operations are performed the fixture is determined to be absolutely level from measurements taken between a pair of hardened blocks 103 provided for this purpose which project from the base 5 (Fig. 1).

It will thus be appreciated that when the table support member 11 is actuated to any desired position as described and as accurately determined from the cooperating scales 91, 93 and microscope 95, the fastener means 55 may be tightened and the pairs of plates 53 thus secured against relative movement to positively retain the table support member in its desired angular position. When the table support member 11 is thus locked in position the driving motor 27 therefor is rendered inoperative by the electrical disconnect means 81 as previously set forth.

What is claimed is:

1. A checking fixture comprising a base having upwardly extending spaced apart arms, a support member having trunnions rotatably carried in said arms so that said support member is supported for rotation about one axis, an electrical motor for driving said support member, a table rotatably carried by said support member for rotation about an axis perpendicular to said one axis, a pair of plates disposed between one of said arms and said support member and projecting outwardly with respect to said base away from said table, said plates being provided with openings through which one of said trunnions extends, one of said plates being stationary and rigid with said one arm, said stationary plate being formed with an aperture outwardly of said opening therein, the other of said plates being movable and secured to said support member at said one side thereof so as to be rotatable therewith adjacent said stationary plate, said movable plate being substantially segmental in shape and having an arcuately shaped slot formed outwardly of its opening which extends over an arc slightly greater than ninety degrees, said slot being continuously in register with said aperture in said stationary plate over the limits of travel of said support member, fastener means extending through said slot in said movable plate and said aperture in said stationary plate and being adapted to be tightened to fixedly secure said plates against relative movement in adjustable positions thereby locking said support member in selectable angular settings with respect to said base, and electrical disconnect means associated with said fastener means and connected with said motor, said electrical disconnect means having a stationary conductive member and a movable member normally spaced from said stationary conductive member and being adapted to make electrical contact with said stationary conductive member upon a predetermined tightening of said fastener means to render inoperative said motor, said slot in said movable plate and said fastener means determining the limits of travel of said support member.

2. A checking fixture comprising a base having upwardly extending spaced apart arms, a support member having trunnions at opposite sides thereof rotatably carried by said arms so that said support member is rotatably supported for rotation about one axis, an electrical motor for driving said support member, a table rotatably carried by said support member for rotation about an axis perpendicular to said one axis, a pair of plates disposed between each of said arms and the opposite sides of said support member and projecting outwardly with respect to said base away from said table, said plates of each pair having openings through which one of said trunnions extends, one plate of each pair being stationary and rigid with said base at one of said arms, the other plate of each pair being movable and secured to said support member at one of said opposite sides so as to be rotatable therewith adjacent its respective stationary plate, each stationary plate being provided with an aperture formed outwardly of its opening each movable plate being substantially segmental in shape and having formed outwardly of its opening an arcuately shaped slot which extends over an arc slightly greater than ninety degrees, said slot in each movable plate being continuously in register with the aperture in its respective adjacent stationary plate over the limits of travel of said support member, fastener means comprising a bolt and a nut threadably received on the shank of said bolt associated with each pair of plates, the shank of each bolt being disposed so as to extend through the aperture in the stationary plate and the slot in the movable plate of each pair, each nut upon being tightened being adapted to fixedly secure each pair of plates against relative movement in adjustably different positions thereby locking said support member in selectable angular settings with respect to said base, and electrical disconnect means connected with said motor and associated with each pair of plates and with each nut and bolt, said electrical disconnect means comprising a stationary conductive member and a movable plunger spring biased away from said stationary conductive member normally out of contact therewith and being arranged to complete an electrical circuit upon a predetermined tightening of its respective nut to render inoperative said motor, the slots in said movable plates and the fastener means determining the limits of travel of said support member.

References Cited in the file of this patent

UNITED STATES PATENTS

| | | |
|---|---|---|
| 408,259 | Pentz | Aug. 6, 1889 |
| 1,454,080 | Sears | May 8, 1923 |
| 1,881,954 | Payzant | Oct. 11, 1932 |
| 2,042,937 | Hendricksen | June 2, 1936 |
| 2,269,946 | Lange | Jan. 13, 1942 |
| 2,329,756 | Granberg | Sept. 21, 1943 |
| 2,355,812 | Martindell | Aug. 15, 1944 |
| 2,422,909 | Kangas | June 24, 1947 |
| 2,535,490 | Emrick | Dec. 26, 1950 |
| 2,593,837 | Broschke | Apr. 22, 1952 |

FOREIGN PATENTS

| | | |
|---|---|---|
| 676,020 | England | July 23, 1952 |